United States Patent [19]

Chee

[11] Patent Number: 4,634,081
[45] Date of Patent: Jan. 6, 1987

[54] AFT ENGINE MOUNT WITH VIBRATION ISOLATORS

[75] Inventor: Wan T. Chee, Bellevue, Wash.

[73] Assignee: The Boeing Company, Seattle, Wash.

[21] Appl. No.: 567,226

[22] Filed: Dec. 30, 1983

[51] Int. Cl.[4] .............................................. B64D 27/00
[52] U.S. Cl. .................................... 244/54; 60/39.31; 248/557
[58] Field of Search .............. 244/53 R, 54; 60/39.31, 60/226.1; 248/554–557

[56] References Cited

U.S. PATENT DOCUMENTS

| | | |
|---|---|---|
| 1,815,442 | 7/1931 | Masury . |
| 1,892,065 | 12/1932 | Markey . |
| 2,367,697 | 1/1945 | Stitz et al. . |
| 2,460,586 | 2/1949 | Keetch . |
| 2,891,743 | 6/1959 | Bligard et al. . |
| 3,168,270 | 2/1965 | Bligard et al. . |
| 3,750,983 | 8/1973 | Morris . |
| 3,809,340 | 5/1974 | Dolgy et al. . |
| 3,837,602 | 9/1974 | Mullins . |
| 3,848,832 | 11/1974 | Stanley .................................. 244/54 |
| 4,044,973 | 8/1977 | Moorehead ......................... 248/554 |
| 4,097,011 | 6/1978 | White . |
| 4,266,741 | 5/1981 | Murphy . |
| 4,458,863 | 7/1984 | Smith ................................... 244/54 |

FOREIGN PATENT DOCUMENTS 979958  5/1951  France .

Primary Examiner—Galen L. Barefoot
Attorney, Agent, or Firm—Christensen, O'Connor, Johnson & Kindness

[57] ABSTRACT

An aft engine mount, for use in supporting a jet engine from a wing of an aircraft occupies a minimum amount of the space between the wind and the engine, permitting a maximum vertical dimension (depth) of the engine-mounting strut. The mount includes a yoke, the arms of which are pivotally attached to the engine. The yoke is in turn attached to a vibration isolator mounted within an isolator housing that is affixed to the engine-mounting strut. The isolator housing is preferably mounted in a recess in a lower surface of the strut to provide for maximum effective strut height. The vibration isolator includes a pair of support fittings, each of which is contained within an associated compartment formed in the isolator housing. Each support fitting includes first and second ends surrounded by a resilient material to provide a close fit of the support fitting within the housing. The resilient material surrounding the ends of the support fitting provides damping of vertical vibration. Plugs of resilient material are placed adjacent each end of the support fittings between such ends and the adjacent end walls of their associated compartment. The plugs damp out sideways vibration. Preferably, the resilient material used for vibration damping is resistant to the high temperature that are present in the area of the engine.

9 Claims, 3 Drawing Figures

AFT ENGINE MOUNT WITH VIBRATION ISOLATORS

BACKGROUND OF THE INVENTION

This invention relates to engine mounts for jet aircraft engines and more particularly relates to an aft engine mount that provides adequate support for the engine and accommodates thermal growth of the engine and also includes vibration isolation.

Typically, a jet engine is mounted beneath the wing of a commercial airliner by forward and aft engine mounts attached to struts affixed to and extending downwardly from the wing structure. The forward mount is typically rigid and thermal expansion of the engine, both radially and longitudinally, is accounted for in the aft engine mount. The aft engine mount is also typically designed to react against vertical, side, and engine seizure (torque) loads. The problem of vibration isolation has not been adequately addressed by present engine mounts, although the use of vibration isolators to dampen airplane interior cabin rumble noise generated by the engine rotor and transmitted through the engine mount to the aircraft are basic requirements for many airplane models.

It has been difficult to design an aft engine mount with vibration isolators to react against engine torque because of the elevated temperature environment and because of the space limitations between the engine case and the strut lower surface. In most airplanes having wing-mounted engines, there is a need to install the engine as close to the wing as possible in order to obtain the maximum ground clearance and to shorten landing gear length for weight saving. Typically, the strut between wing and engine is reduced in height in order to allow a reduction in the space between the wing lower surface and the exterior contour of the engine cowling. However, airplane flutter may occur because of the "soft" structure of the strut, the softness of the strut structure being directly related to its short length or "shallowness."

It is therefore an object of the present invention to provide an aft engine mount with the capability of reacting against torque loads while substantially isolating the strut from engine vibration.

It is another object of this invention to provide such an aft engine mount that will fit into a minimum space between the wing and engine while permitting the maximum vertical dimension of the strut.

It is a further object of this invention to provide such an aft engine mount that also meets the usual requirements of load handling and is stiff enough to react against the vertical, side and torque loads, and also complies with existing standards for ease of manufacture, installation, and maintenance, and also that allows for the radial and longitudinal thermal growth of the engine.

SUMMARY OF THE INVENTION

In accordance with the above-stated objects, an engine mount for use in a position at the aft end of the core of a jet engine, which is mounted to and beneath a wing of the aircraft, is provided. The low-profile mount of the present invention occupies a minimum amount of the space between the wing and the engine, permitting a maximum vertical dimension (depth) of the engine-mounting strut. The engine mount includes a yoke attached to the engine core at two locations spaced from one another a distance greater than the width of the engine-mounting strut. The yoke is affixed to an isolator housing, which, in turn, is affixed to the engine-mounting strut. The isolator housing is preferably mounted within a recess formed in the lower surface of the mounting strut. The isolator housing contains within it two identical vibration isolation assemblies mounted side by side, each of the vibration isolation assemblies including a support fitting. The support fitting has first and second ends that are surrounded by a resilient material closely fit between the walls of the housing and the exterior of the support fitting to react against vertical forces on the engine. Each vibration isolation assembly further includes a resilient plug adjacent each end of the support fitting, closely fitting between the end of the support fitting and the sidewalls of a first compartment of the isolator housing to resist sideways movement of the engine and yoke assembly. Preferably, the yoke is attached to the engine core by spherical bearings that permit fore/aft pivotal movement of the engine about the mounting points.

BRIEF DESCRIPTION OF THE DRAWINGS

The features and advantages of the present invention will be better understood by those of ordinary skill in the art and others upon reading the ensuing specification, when taken in conjunction with the appended drawings wherein.

DETAILED DESCRIPTION OF THE PREFERRED EMBODIMENT

Figure 1:
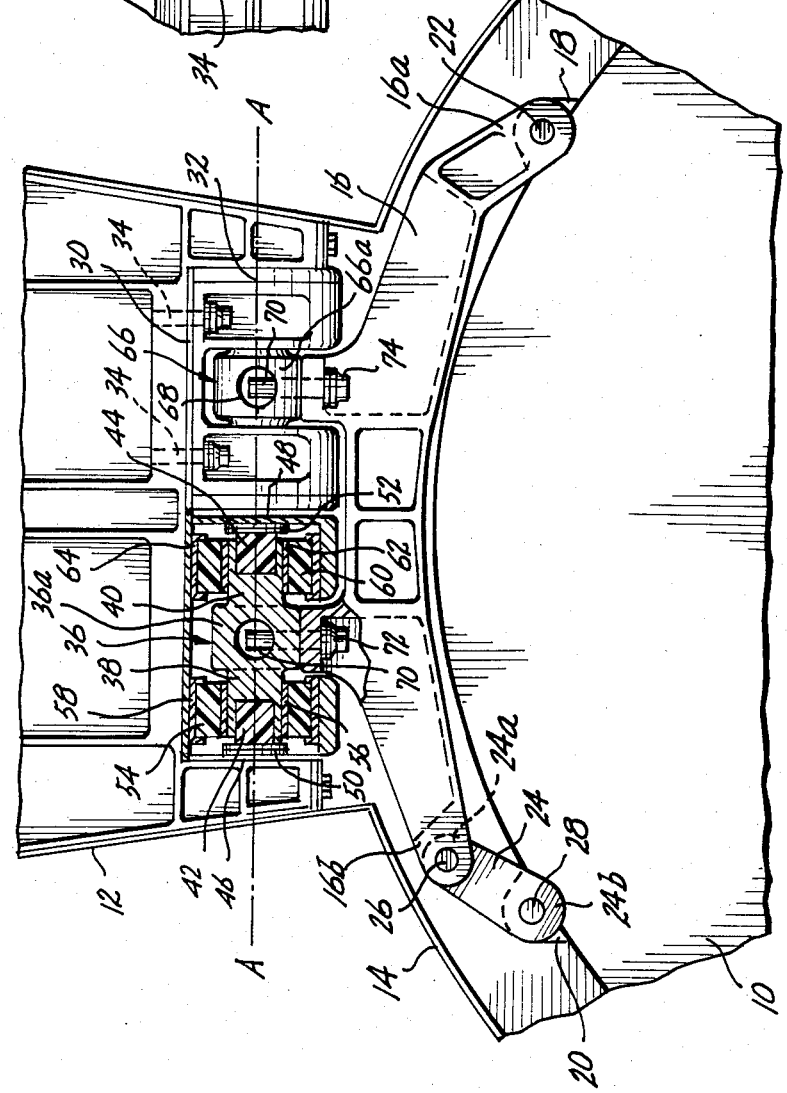
FIG. 1 is a rear elevational view of one embodiment of an aft engine mount made in accordance with the principles of the present invention.

FIG. 1 illustrates one embodiment of an aft engine mount made in accordance with the principles of the present invention. An engine core 10 is supported beneath the wing of an aircraft from an engine-mounting strut 12. Typically, the engine 10 is surrounded by a cowling 14, which provides aerodynamic smoothness to the engine. The engine mount includes a yoke 16 that is affixed to the engine by means of a mounting ring surrounding the engine. The mounting ring has a first ear 18 and a second ear 20 extending therefrom. A first end 16a of the yoke is attached to the first mounting ear 18 by means of a spherical bearing 22. A second end 16b of the yoke is attached to a first end 24a of a mounting link 24. The second end 24b of the mounting link 24 is attached to the second mounting ear 20. Preferably, the first end of the mounting link is pivotally attached to the second end of the yoke by means of a pin 26 for pivotal movement about an axis parallel to the engine axis, while the second end 24b of the link is attached to the mounting ear 20 by means of a spherical bearing 28.

In the illustrated embodiment of FIG. 1, the strut 12 has a recess formed in its lower surface and a cover plate 30 is positioned adjacent the uppermost surface of the recess. An isolator housing 32 is affixed to the cover plate 30 by bolts 34 that pass through holes formed in the isolator housing and cover plate and that threadably engage the mounting strut 12. The isolator housing 32 includes a first compartment and second compartment in which are respectively contained first and second isolator assemblies. The first isolator assembly includes a first support fitting 36 centered in the compartment. The support fitting 36 includes a central portion 36a that is substantially rectangular in both longitudinal and transverse section. A first cylindrical isolator carrier portion 38 extends from a first side of the central portion in a direction orthogonal to the engine axis and an identical second cylindrical isolator carrier portion 40 extends from an opposite side of the central portion 36a substantially coaxially with the first isolator carrier portion. Each of the cylindrical isolator carrier portions 38 and 40 has an axial bore formed therein that receives resilient plug isolator members 42 and 44, respectively. The plug isolator members extend almost to the sidewalls 46 and 48 of the first compartment and have bearing plates 50 and 52, respectively, inserted between the plug isolator and its associated sidewall to form a close fit of the isolator assembly within the compartment. An annular isolator member 54 surrounds the first cylindrical isolator carrier 38 and a first bushing 56 is interposed between the surface of the isolator carrier 38 and the isolator 54. A second bushing 58 is interposed between the isolator 54 and the inner wall of the first compartment. The isolator and its two associated bushings closely fit within the compartment. A second annular isolator 60 surrounds the second isolator carrier portion 40 and has bushings 62 and 64 associated with it to provide a close fit of the isolator within the first compartment. A second isolator assembly, identical to the first isolator assembly, fits within the second compartment of the isolator housing 32 and includes a second support fitting 66 having a central portion 66a.

Figure 2:
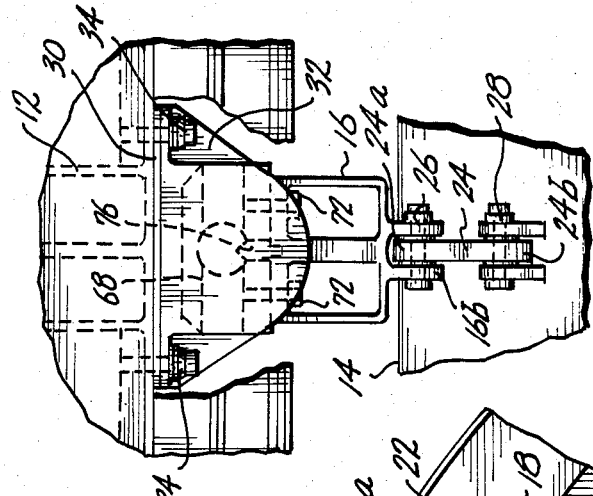
FIG. 2 is a side elevational view of the aft engine mount of FIG. 1.

As can be seen best in the side elevation view of FIG. 2, support fitting 36 has a bore 68 formed through it in a fore/aft direction and two barrel nuts 70 are located within the bore affixed to the central portion 36a of the support fitting. Cooperating bores are formed from each of the barrel nuts through the lower surface of the central portion 36a to accommodate bolts that pass upwardly through the upper surface of the yoke 16 and threadably engage the barrel nuts 70 to affix the yoke to the support fitting. Two similar bolts 74 are used to attach the yoke 16 to the second support fitting 66. Preferably, an alignment pin 76 extends from the upper surface of the yoke 16 and mates with a bore formed in the central portion 36a of the support fitting intermediate the bolts 72. A second alignment pin (not shown) extends from the yoke 16 and mates with a bore formed in the central portion of the second support fitting 66 intermediate the bolts 74.

In the embodiment of FIGS. 1 and 2, the longitudinal thermal growth of the engine is accommodated by pivotal movement about the axis A—A in FIG. 1 of the cylindrical isolator carrier portions within the compartments of the housing 32. Also, pivotal movement in the longitudinal direction is accommodated by the spherical bearings 22 and 28 that attach the arms of the yoke 16 to the engine-mounting ring. Radial expansion caused by thermal growth is accommodated by the single link 24 that is able to pivot about the pin 26. The annular isolators 54 and 60 and their matching isolators in the second compartment provide support in the vertical direction and are used to dampen the vertical mode of vibration, while the plug-shaped isolators 42, 44, and their counterparts in the second compartment, react against side loads and also dampen vibration in the sideways direction. The use of two sets of isolators in the first and second compartments provides vibration damping, while allowing reaction to engine torque forces. The aft engine mount of the present invention allows an increase in the effective depth of the strut needed for vertical stiffness. In actual practice, an increase of as much as three inches in strut depth can be provided, which is equivalent to a 30 percent increase in depth on certain nacelle configurations.

Figure 3:
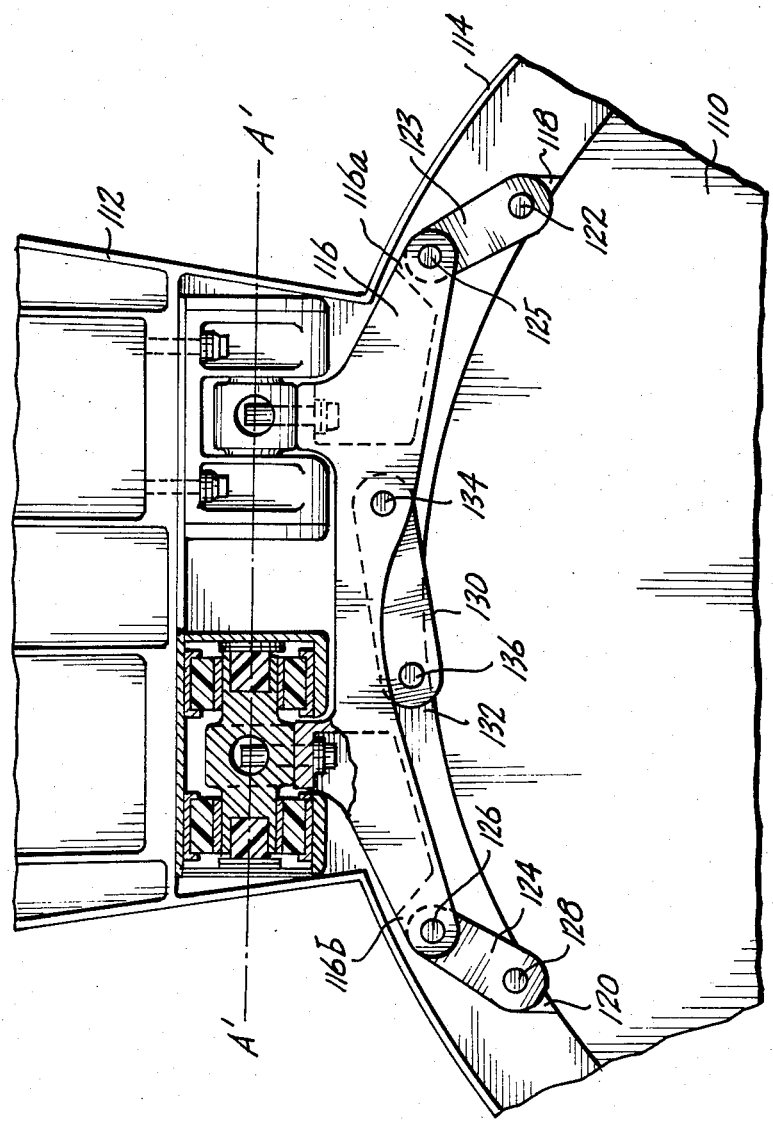
FIG. 3 is a rear elevational view of a second embodiment of an aft engine mount made in accordance with the principles of the present invention.

FIG. 3 illustrates a second embodiment of an aft engine mount made in accordance with the principles of the present invention. The engine 110 is supported beneath an engine-mounting strut 112 by a yoke assembly 116. The vibration isolation mounting between the yoke 116 and the strut 112 is identical to that shown in FIGS. 1 and 2. The engine mount of FIG. 3, however, has a first link 123 connecting a first end 116a of the yoke to a mounting ear 118 extending from the engine-mounting ring. A second mounting link 124 is used to attach a second end 116b of the yoke to a second mounting ear 120. Preferably, the respective first ends of the links 123 and 124 are attached to their associated yoke ends by pins 125 and 126 and the respective second ends of the links 123 and 124 are attached to their associated mounting ears by spherical bearings 122 and 128. Links 123, 124 and 136 can be shortened to allow a tighter wrapping of cowling 114 around the engine for better aerodynamic performance. A third mounting link 130 is attached from a central portion of the yoke 116 to a third mounting ear 132 extending from the engine-mounting ring. Preferably, both first and second ends of the link 130 are attached to the yoke 116 and the mounting ear 132, respectively, by means of pin 134 and spherical bearing 136. It can be seen that the engine mount embodied in FIG. 3 allows for longitudinal growth again by fore/aft pivoting motion about an axis A'—A' running through the vibration isolators and also by means of the spherical bearings 122, 128, and 136 used to attach the yoke 116 to the engine-mounting ring. Radial growth is accommodated by pivotal movement of the links 123, 124 and 130 about pivot pins 125, 126 and 134 and the same low-profile advantages of the mount of FIG. 1 are present in the mount of FIG. 3.

It can be seen, therefore, that a low-profile aft engine mount for use in mounting a jet engine beneath the wing of a jet aircraft is provided that reacts against the normal vertical, side and torque loads on the engine and, in addition, provides isolation from vibration to prevent cabin rumble noise. While preferred embodiments of the invention have been described and illustrated herein, it will be apparent to those of ordinary skill in the art and others that changes can be made to the illustrated embodiments while remaining within the scope of the present invention. For example, while the isolators 54 and 60 are described as annular, it would be possible to provide the isolator carriers 38 and 40 with flat top and bottom surfaces and utilize slabs of material to isolate against vertical vibration. Further, the material used for the isolators 54, 60, 42 and 44 must be resilient to absorb vibration, but stiff enough to accommodate normal engine loading and provide sufficient stiffness to the engine mount. Also, because of its proximity to the high temperatures produced by the engine, the resilient material of the isolators must be sufficiently heat resistant. A suitable material has been found to be a steel wire mesh material sold under the trademark Met-L-Flex by Barry Controls of Burbank, Calif. Also, while the vibration isolation assemblies have been described as being identical, it would be possible to make changes in one or the other of the isolators and still maintain the desired vibration damping. For example, the plugs 42 and 44 could be omitted from the second isolator assembly to allow for easy installation, weight savings or for other reasons. Because changes can be made to the illustrated and described embodiments of the invention while remaining within the scope of the invention, the invention should be defined solely with reference to the appended claims.

The embodiments of the invention in which an exclusive property or privilege is claimed are defined as follows:

1. In an aircraft having a jet engine mounted to and beneath a wing thereof, wherein said engine is a predetermined distance from said wing and wherein further said engine is mounted to a strut affixed to said wing, a low-profile, aft engine mount assembly mounted to said strut and said engine to hold said engine on said strut, said aft engine mount assembly constructed and arranged to occupy a minimum portion of the distance between said engine and said wing so as to provide the maximum strut vertical dimension and so as to keep said aft engine mount within the contours of a cowl surrounding said engine, said aft engine mount assembly being further constructed and arranged to accommodate longitudinal growth of said engine due to thermal expansion, while maintaining sufficient stiffness to react against vertical, side, and torsional loads on said engine, said aft engine mount assembly being further constructed and arranged to provide vibration isolation between said engine and said strut, said engine mount assembly including a yoke having a first arm and a second arm, said first and second arms being pivotally attached at respective first ends thereof to said engine, said yoke being affixed to said strut at first and second attachment locations, spaced from one another and both located on an axis substantially orthogonal to the longitudinal axis of said engine, said aft engine mount assembly further including a first vibration isolation means associated with said strut at said first location and a second vibration isolation means associated with said strut at said second location.

2. The aft engine mount assembly of claim 1, wherein said first and second vibration isolation means each include:
   a first compartment;
   a support fixture mounted within said compartment, said support fixture including a central portion, and first and second isolator-mounting portions extending in opposite directions from said central portion;
   a first isolator member mounted intermediate an interior wall of said first compartment and an exterior surface of said first isolator-mounting portion to react against vertical loads on said engine;
   a second isolator member mounted intermediate said interior wall of said first compartment and an exterior surface of said second isolator-mounting portion to react against vertical loads on said engine;
   a third isolator member mounted intermediate a first end wall of said first compartment and an end wall of said first isolator-mounting portion to react against side loads on said engine; and
   a fourth isolator member mounted intermediate a second end wall of said first compartment and said second isolator-mounting means to react against side loads on said engine.

3. The aft engine mount assembly of claim 1 further including:
   an engine-mounting ring affixed to said engine;
   means for attaching said first arm of said yoke to said engine-mounting ring; and
   means for mounting said second arm of said yoke to said engine-mounting ring at a point on said ring spaced from the point of attachment of said first arm to said ring.

4. The aft engine mount assembly of claim 3 wherein said first arm of said yoke is attached directly to said engine-mounting ring by means of a spherical bearing and further including a first link, a first end of which is pivotally mounted to said second arm of said yoke for pivotal movement about an axis parallel to the engine axis and said second end of said link is pivotally attached to said engine-mounting ring by means of a spherical bearing.

5. The aft engine mount assembly of claim 3 further including:
   a first link pivotally attached at a first end thereof to said first arm of said yoke for pivotal movement about an axis parallel to said engine axis, a second end of said first link being attached to said mounting ring by means of a spherical bearing;
   a second link attached at a first end thereof to said second arm for pivotal movement of said second link about an axis parallel to said engine axis, a second end of said second link being attached to said mounting ring by means of a spherical bearing; and
   a third link, a first end of which is attached to said yoke intermediate said first and second links, a second end of said third link being attached to said mounting ring by means of a spherical bearing.

6. The aft engine mount assembly of claim 2 wherein said first and second isolator-mounting portions are cylindrical and said first and second isolator members are substantially annular and surround the outer periphery of said isolator-carrying portions.

7. The aft engine mount assembly of claim 6 wherein said first and second isolator-mounting portions have axial bores formed therein, at least a portion of said third and fourth isolator members being received respectively within said bores in said first and second isolator-mounting portions.

8. The aft engine mount assembly of claim 2 further including:
   first and second alignment pins extending from an upper surface of said yoke and adapted to be closely received by bores formed in the central portion of each of said first and second support fixtures to align said yoke with said strut.

9. The aft engine mount assembly of claim 2 wherein said strut has a recess formed within a lower surface thereof, said first and second vibration isolation means housing being mounted within said recess.

* * * * *